G. A. TITUS
Grain Drill.
No. 44,236. Patented Sept. 13, 1864.
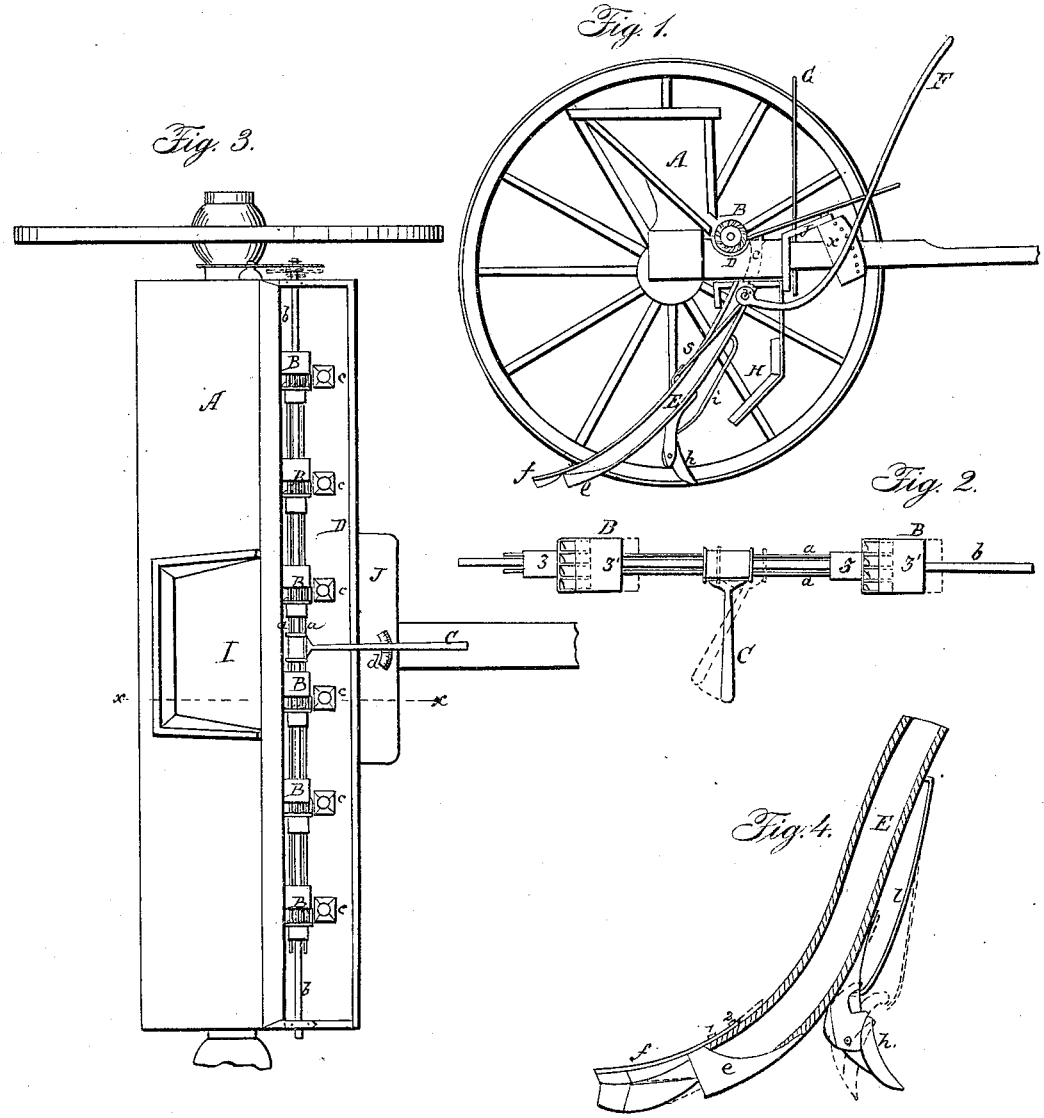
Witnesses:
H. E. Dodge
R. D. O. Smith
Inventor:
G. A. Titus
By Smith & Dodge
Attorneys.

UNITED STATES PATENT OFFICE.

G. A. TITUS, OF MANTORVILLE, MINNESOTA.

SEEDING-MACHINE.

Specification forming part of Letters Patent No. 44,236, dated September 13, 1864.

*To all whom it may concern:*

Be it known that I, G. A. TITUS, of the town of Mantorville, in the county of Dodge and State of Minnesota, have invented new and useful Improvements in Machines for Sowing and Drilling Grain; and I do hereby declare that the following is a full, clear, and exact description thereof, reference being had to the accompanying drawings, making part of this specification, and to the letters of reference marked thereon, in which—

Figure 1 is a vertical section taken in the line of $x\ x$, Fig. 3. Fig. 2 is a view of the seed-rollers detached; Fig. 3, a plan or top view of the machine, and Fig. 4 a longitudinal section of one of the drill-tubes with its furrowing and covering devices attached.

A represents the seed-hopper, which is of a triangular shape in its cross-section, as shown in Fig. 1, and is mounted upon two wheels in the usual manner. Upon the frame D, in front of and at the bottom of hopper A, is arranged a series of feed-rollers, B, mounted upon a shaft, $b$, which shaft has its bearings at each end of the frame D, and is driven by gearing on one of its ends connecting with a grear-wheel upon the hub of one of the wheels of the machine, as shown in Fig. 3. These feed-rollers B (see Fig. 2) are made of two parts, one consisting of a series of radial buckets or cups, the other being a head or drum with slots or openings in the end next to the buckets, fitted to receive the flanges or divisions between said buckets. One part of said bucket is secured rigidly to shaft $b$, while the other part is rigidly attached to the two rods $a\ a$. By means of the lever C the parts $z'$, which are attached to the rods $a\ a$, may be moved to the right, and thereby enlarge the size of the buckets, and by these means the quantity of grain sown may be regulated as desired. To indicate the quantity sown a plate, $d$, is placed underneath the lever C, which plate $d$ has marks upon it indicating the number of bushels sown per acre. (See Fig. 3.)

At the bottom of hopper A, directly in the rear of each feed-roller B, an opening is made, through which the grain flows into the cells or cups of B, which carry said grain upward and forward, delivering it into the openings $c$ in frame D, there being one of said openings or passages opposite each roller B, as clearly shown in Fig. 3.

Directly underneath each opening or passage $c$ is hung a seed-tube, E. These tubes E are slightly curved, as shown in Fig. 4, and are made triangular in their cross-section, with the apex downward, and at their rear ends are shod with metal, as shown by $e$, Fig. 4.

To the under side of E, and in front of $e$, furrow-openers $h$ are attached. These are pivoted as shown in Fig. 4, the upper end of $h$ being pressed back by the spring $i$, also secured to E.

To the rear end of tube E is secured a coverer, $f$, by means of bolts 1 and 2, which pass through a slot in the upper portion of $f$, whereby the latter may be adjusted, as indicated in red, and thus made to cover the grain more or less deep, as may be desired. These tubes E are secured at their upper ends to a rod, $r$, passing longitudinally underneath the frame D, and to which they are also secured by the brace $s$. To the rod $r$ is rigidly secured the lever F, which has upon its side a pin to engage in the holes in plate $x$ of Fig. 1, by which the tubes E may have their rear ends depressed or elevated and held in position, as desired.

The lever G, Fig. 1, connects with and operates a sliding device located beneath the frame D, which throws the gear-wheel upon the end of shaft $b$ in or out of gear at the pleasure of the operator, as indicated in red in Fig. 3.

A driver's seat, L, may be located on the cover of hopper A, as shown in Fig. 3, from which position, with his feet resting upon the foot-board J, the driver can readily reach and operate the levers C, F, and G.

The operation is as follows: The grain to be drilled being placed in hopper A, the wheel on shaft $b$ is thrown into gear by means of lever G, and the machine moved forward. The grain flows through the openings at the lower front side of the hopper into the cells or cups of B, which, as they rotate forward, deliver it into the openings $c$, from whence it passes down into the open end of tubes E, and flows thence down along said tubes into the drill-furrow prepared for it by furrow-openers $h$ and $e$, when it is covered by $f$, which, standing diagonally to the line of travel, presses the loose earth into the furrow, thus completely covering the seed. If $h$ chances to strike a root or stone, the spring $i$ yields, and, allowing $h$ to change its position, as indicated in red in Fig. 4, it readily passes over the obstruction without raising E out of the earth, when h quickly returns to its original position again.

When it is desired to sow grain broadcast instead of in drills the rod r, with the tubes E and lever F, are detached from the machine. In such case the grain falling from the passages c strikes upon the deflecting or scattering board H, by which it is spread evenly over the surface of the ground. The object of making this board H concave and locating it so low is to prevent the grain from being blown to one side by strong gusts of wind, and thus to secure its even distribution.

Having thus described my invention and its construction and operation, what I claim, and desire to secure by Letters Patent, is—

1. The feed-rollers B, in combination with the triangular hopper A and openings c, when constructed and operating as described.

2. The tubes E, when constructed and operating as described.

3. In combination with the tubes E, the pivoted furrow-openers h and spring i.

4. In combination with the tube E, the adjustable coverers f, substantially as shown.

5. The concave scattering-board H, when constructed and operating as shown and described.

G. A. TITUS.

Witnesses:
S. L. PIERCE,
E. VAN WIE.